(12) United States Patent
Santos et al.

(10) Patent No.: US 10,451,831 B2
(45) Date of Patent: Oct. 22, 2019

(54) FIBER OPTIC STRIP AND CUT TOOL

(71) Applicant: Ripley Tools, LLC, Cromwell, CT (US)

(72) Inventors: Manuel A. Santos, Meriden, CT (US); Sean Powell, East Haddam, CT (US); Kevin Kilton, Lebanon, CT (US); Paul Phillips, Middlebury, CT (US)

(73) Assignee: Ripley Tools, LLC, Cleveland, OH (US)

( * ) Notice: Subject to any disclaimer, the term of this patent is extended or adjusted under 35 U.S.C. 154(b) by 56 days.

(21) Appl. No.: 14/895,022

(22) PCT Filed: Jul. 24, 2014

(86) PCT No.: PCT/US2014/047965
§ 371 (c)(1),
(2) Date: Dec. 1, 2015

(87) PCT Pub. No.: WO2015/013491
PCT Pub. Date: Jan. 29, 2015

(65) Prior Publication Data
US 2016/0131864 A1  May 12, 2016

Related U.S. Application Data

(60) Provisional application No. 61/864,121, filed on Aug. 9, 2013, provisional application No. 61/857,838, filed on Jul. 24, 2013.

(51) Int. Cl.
G02B 6/44 (2006.01)
G02B 6/245 (2006.01)
(Continued)

(52) U.S. Cl.
CPC .......... *G02B 6/4497* (2013.01); *B26D 3/166* (2013.01); *B26D 3/169* (2013.01); *G02B 6/245* (2013.01);
(Continued)

(58) Field of Classification Search
CPC ........ G02B 6/4497; G02B 6/46; G02B 6/245; G02B 6/25; B26D 3/169; B26D 3/166; H02G 1/1212; B26B 13/005; B26B 29/04
(Continued)

(56) References Cited

U.S. PATENT DOCUMENTS 3,906,561 A * 9/1975 Bawa ................. B25B 7/22
30/162
4,502,220 A * 3/1985 Aoki .................. B26B 13/005
30/154

(Continued)

*Primary Examiner* — Jonathan G Riley
(74) *Attorney, Agent, or Firm* — DeLio Peterson & Curcio LLC; Thomas E. Ciesco

(57) ABSTRACT

A fiber optic stripping and cutting apparatus comprising a tool housing and a stripping tool slidingly secured to the tool housing, the stripping tool having a pair of opposing stripping blades pivotable with respect to each other, each stripping blade having at least two teeth, the teeth on one stripping blade aligned with teeth on the opposite stripping blade. The fiber optic stripping and cutting apparatus includes a cutting tool removably secured to the tool housing, the cutting tool having a pair of opposing flat blades, each flat blade including a sharp edge. The stripping and cutting tools are each independently slideable from a retracted position within the housing to an extended position at least partially extending from the tool housing. The stripping tool and cutting tool may be removable from the tool housing.

17 Claims, 4 Drawing Sheets

(51) Int. Cl.
  *G02B 6/25* (2006.01)
  *H02G 1/12* (2006.01)
  *B26D 3/16* (2006.01)
  *G02B 6/46* (2006.01)
(52) U.S. Cl.
  CPC .............. *G02B 6/25* (2013.01); *G02B 6/46* (2013.01); *H02G 1/1212* (2013.01)
(58) Field of Classification Search
  USPC ............... 30/162, 151, 152; 7/118, 120, 158
  See application file for complete search history.

(56) References Cited

U.S. PATENT DOCUMENTS

| | | | | |
|---|---|---|---|---|
| 4,715,121 A * | 12/1987 | Sugiyama | ............... | B26B 29/04 30/162 |
| 4,791,725 A * | 12/1988 | Amagaya | ................ | B26B 13/12 30/154 |
| 4,942,637 A * | 7/1990 | Yeang-Yai | ................ | B25B 7/00 7/135 |
| 5,353,505 A * | 10/1994 | Okada | ..................... | B26B 13/18 30/236 |
| 5,584,123 A * | 12/1996 | Chi | ........................ | B23D 51/01 30/125 |
| 5,713,132 A * | 2/1998 | Tarpill | ................. | H02G 1/1224 30/90.1 |
| 6,185,771 B1 | 2/2001 | Trusty, Sr. | | |
| 6,363,614 B1 * | 4/2002 | Umstead | ................ | B23D 51/01 30/144 |
| 7,017,462 B2 | 3/2006 | Hullam | | |
| 7,377,043 B2 * | 5/2008 | Tsai | ........................ | B26B 13/12 30/135 |
| 2005/0044715 A1 * | 3/2005 | Shutts | .................. | G02B 6/4497 30/90.1 |
| 2005/0081386 A1 * | 4/2005 | Chang | ..................... | A01G 3/02 30/151 |
| 2005/0092148 A1 * | 5/2005 | Hullam | ................... | B26B 13/06 83/13 |
| 2007/0067996 A1 | 3/2007 | Chang | | |
| 2007/0186351 A1 | 8/2007 | Linn et al. | | |
| 2008/0236210 A1 | 10/2008 | Frazer | | |
| 2009/0293284 A1 * | 12/2009 | Avery | ................... | B26B 11/001 30/152 |
| 2016/0103291 A1 * | 4/2016 | Santos | ................... | G02B 6/245 30/91.2 |

\* cited by examiner

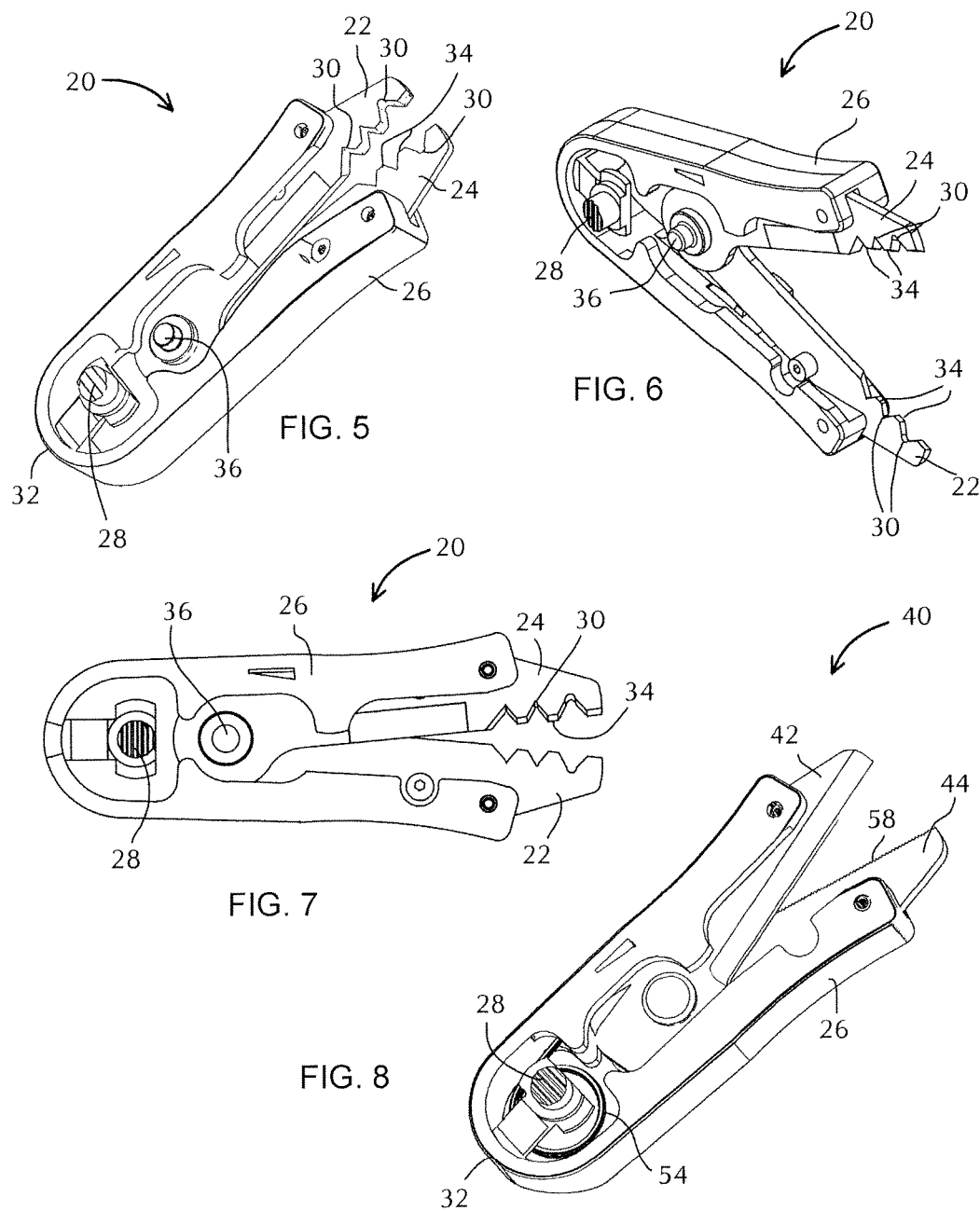

FIBER OPTIC STRIP AND CUT TOOL

BACKGROUND OF THE INVENTION

1. Field of the Invention

The present invention is directed to a tool for stripping the outer layer off a fiber optic cable and cutting the protective fibers such as aramid yarn or Kevlar fibers within the fiber optic cable, the tool having retractable sub-assemblies.

2. Description of Related Art

One type of fiber optic cable includes one or more fiber optic strands surrounded by a UV cured buffer coating. The buffer coating is surrounded by a buffer tube which is surrounded by protective fibers such as aramid yarn or Kevlar fibers. The fiber optic cable also includes an outer jacket which may be polyurethane. In order to access the fiber optic strands, each layer must be carefully removed in order to prevent damage to any of the layers below. Each layer typically requires the use of a specialized tool. A technician accessing the fiber optic core or the fiber optic strands in the center of the cable carries at least several of these specialized tools, removing one layer, placing the used tool in his bag or belt, retrieving another tool for removing the next layer, and repeating this for each layer which may be removed. There is a need for a tool which saves the technician time in performing these tasks.

SUMMARY OF THE INVENTION

Bearing in mind the problems and deficiencies of the prior art, it is therefore an object of the present invention to provide a tool which performs multiple functions in working with fiber optic cables.

It is another object of the present invention to provide a tool which has retractable sub-assemblies for stripping fiber optic cable layers.

A further object of the invention is to provide a tool which safely secures cutting surfaces while providing multiple functions within the tool.

It is yet another object of the present invention to provide a tool which strips the outer jacket from a fiber optic cable and cuts the aramid yarn or Kevlar from one of the inner layers of the fiber optic cable.

Another object of the present invention is to provide a tool which includes removable subassemblies for working with fiber optic cables.

A further object of the invention is to provide a multiple function tool for stripping layers from fiber optic cable having the ability to lock each function in the extended and retracted position.

Still other objects and advantages of the invention will in part be obvious and will in part be apparent from the specification.

The above and other objects, which will be apparent to those skilled in the art, are achieved in the present invention which is directed to a fiber optic stripping and cutting apparatus comprising a tool housing and a stripping tool slidingly secured to the tool housing, the stripping tool having a pair of opposing stripping blades pivotable with respect to each other, each stripping blade having at least two teeth, the teeth on one stripping blade aligned with teeth on the opposite stripping blade. The fiber optic stripping and cutting apparatus includes a cutting tool removably secured to the tool housing, the cutting tool having a pair of opposing flat blades, each flat blade including a sharp edge. The stripping and cutting tools are each independently slideable from a retracted position within the housing to an extended position at least partially extending from the tool housing.

The stripping tool and cutting tool may be removable from the tool housing. The stripping tool may include a first protrusion engagable with a first aperture on the tool housing for locking the stripping tool in the extended position and the cutting tool may include a second protrusion engagable with a second aperture on the tool housing for locking the cutting tool in the extended position. The stripping tool may include a first protrusion engagable with a first aperture on the tool housing for locking the stripping tool in the retracted position and the cutting tool may include a second protrusion engagable with a second aperture on the tool housing for locking the cutting tool in the retracted position. The stripping tool may include a first protrusion slidable within a first slot on the tool housing for allowing a user access to the first protrusion for moving the stripping tool from the retracted position to the extended position and from the extended position to the retracted position. The cutting tool may include a second protrusion slidable within a second slot on the tool housing for allowing the user access to the second protrusion for moving the stripping tool from the retracted position to the extended position and from the extended position to the retracted position. The stripping tool and cutting tool each may include a sheath having a first and second arm pivotable about a sheath fulcrum, the first arm securing one stripping tool blade or cutting tool blade and the second arm securing the opposite stripping tool blade or cutting tool blade. The fiber optic stripping and cutting apparatus may include notches between each of the stripping tool teeth, the fiber optic cable engagable within the notches. The stripping blades may include at least one notch aligned with a notch on the opposing stripping blade and the fiber optic cable may be engagable between the aligned notches. Each stripping blade may include three different sized notches each aligned with opposing notches on the opposite stripping blade. The cutting tool may include a spring for biasing the cutting tool in an open position. The cutting tool may include serrations on at least one of the cutting blades.

Another aspect of the present invention is directed to a method for using a fiber optic stripping and cutting apparatus. The method includes providing a stripping tool and a cutting tool each independently slidingly secured to a tool housing, the stripping tool having a pair of opposing stripping blades pivotable with respect to each other, each stripping blade having at least two teeth, the teeth on one stripping blade aligned with teeth on the opposite stripping blade and the cutting tool having a pair of opposing flat blades, each flat blade including a sharp edge, wherein the first and second utensil are each independently slideable from a retracted position within the housing to an extended position at least partially extending from the tool housing. The method includes providing a fiber optic cable having an optical fiber, strands of protective fibers and an outer jacket, extending the stripping tool from the housing and using the stripping tool to remove a portion of the outer jacket, exposing a portion of the protective fiber strands. The method includes retracting the stripping tool into the housing, extending the cutting tool from the housing, using the cutting tool to cut the exposed portion of the protective fiber strands and retracting the cutting tool into the housing.

The step of using the stripping tool to remove a portion of the outer jacket may include placing the cable between the at least two teeth, urging each of the stripping blades toward one another and pulling the cable perpendicular to a plane of one of the stripping blades, forcing a portion of the outer jacket from the cable. The step of using the cutting tool to remove a portion of the protective fibers may include placing the exposed protective fibers between the cutting blades and urging each of the cutting blades toward one another, cutting a portion of the protective fibers from the cable. The stripping tool may include a protrusion and the tool housing may include a slot and an aperture near the end of the housing and the step of extending the stripping tool from the housing may include pressing the protrusion and sliding the protrusion along the slot to the aperture and releasing the protrusion to extend into the aperture, locking the stripping tool into the extended position. The cutting tool may include a protrusion and the tool housing may include a slot and an aperture near the end of the housing and the step of extending the cutting tool from the housing may include pressing the protrusion and sliding the protrusion along the slot to the aperture and releasing the protrusion to extend into the aperture, locking the cutting tool into the extended position. Each of the stripping and cutting tools may include a protrusion slidable within a corresponding groove on the tool housing and the step of extending the stripping tool from the housing may include depressing the stripping tool protrusion and urging the stripping tool protrusion along the groove until the stripping tool protrusion engages a locking stripping tool aperture on the housing and the step of extending the cutting tool from the housing may include depressing the cutting tool protrusion and urging the cutting tool protrusion along the groove until the cutting tool protrusion engages a locking cutting tool aperture on the housing. Each stripping blade may include three different sized notches each aligned with opposing notches on the opposite stripping blade and the step of using the stripping tool to remove a portion of the outer jacket may include choosing an appropriate notch pair and engaging the fiber optic cable in the chosen notch pair.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 5 is a perspective view of the stripping sub-assembly.

FIG. 6 is a perspective view of the stripping sub-assembly.

FIG. 7 is a side elevational view of the stripping sub-assembly.

FIG. 8 is a perspective view of the cutting sub-assembly.

DESCRIPTION OF THE PREFERRED EMBODIMENT(S)

In describing the preferred embodiment of the present invention, reference will be made herein to FIGS. 1-15 of the drawings in which like numerals refer to like features of the invention.

The Fiber Optic Strip and Cut Tool ("FO-SnC") combines 2 independent retractable features into a single hand held pocket size tool—one device is a 3-hole fiber optic stripping tool used to prepare the fiber optic strand for connector termination and the other device is a cutter used for cutting the strands of protective fibers such as aramid yarn or Kevlar fiber.

Each independent device may be moved axially by depressing a locking feature which secures the device in the extended position or in the retracted position. Once the locking feature has been depressed, the device may be moved axially within the main body.

When each device is in the extended position, that device can be actuated by compressing opposing surfaces.

Figure 1:
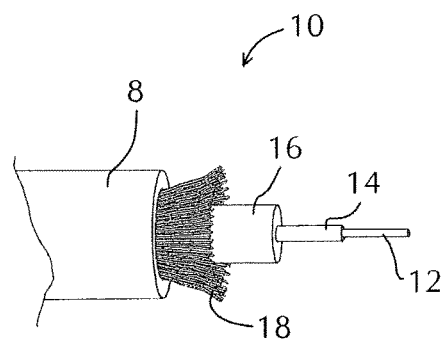
FIG. 1 is a side view of a fiber optic cable having a portion of each layer removed.

FIG. 1 shows a fiber optic cable 10 including a central optical fiber 12, a fiber optic cladding 14 and a coating or buffer tube 16. The fiber optic cable includes Kevlar or aramid yarn 18 and an outer jacket 8. The optical fiber 12 carries a light signal which contains the data to be transmitted through the cable. The fiber optic cladding 14 may be one or more layers of materials of low refractive index in close contact with the optical fiber 12. The cladding 14 causes light to be confined to the optical fiber 12 by total internal reflection at the boundary between the optical fiber 12 and cladding 14. The buffer tube 16 is one of the protective layers as are the aramid yarn fibers 18 and outer jacket 8. The outer jacket may be polyurethane or plastic based material.

Figure 2:
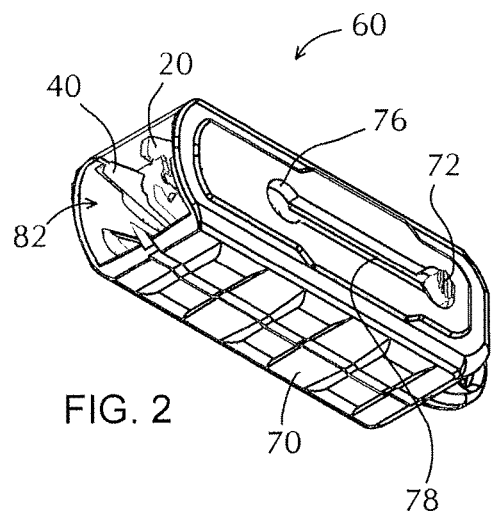
FIG. 2 is a perspective view of the fiber optic strip and cut tool with the cutting and stripping sub-assemblies in the retracted position.
Figure 3:
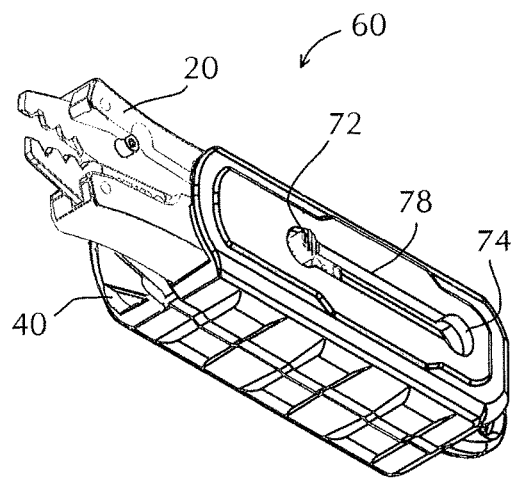
FIG. 3 is a perspective view of the fiber optic strip and cut tool with the stripping sub-assembly in the retracted position.
Figure 4:
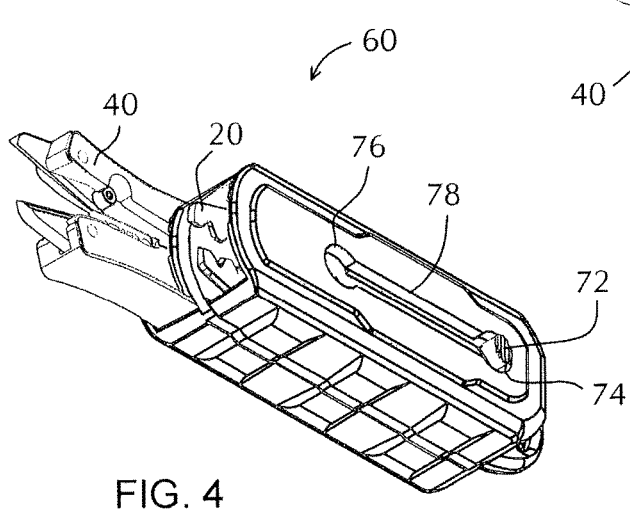
FIG. 4 is a perspective view of the fiber optic strip and cut tool with the cutting sub-assembly in the retracted position.

The fiber optic strip and cut tool 60 is shown in FIGS. 2-4. The fiber optic strip and cut tool 60 includes a stripping tool sub-assembly 20, a cutting tool sub-assembly 40 and a housing 70 which includes a front opening 82 from which the stripping tool sub-assembly 20 and cutting tool sub-assembly 40 slidingly extends. The stripping tool sub-assembly 20 and cutting tool sub-assembly 40 are independently slidable within the housing 70. FIG. 2 shows both the stripping tool sub-assembly 20 and cutting tool sub-assembly 40 in the retracted position. FIG. 3 shows the stripping tool sub-assembly 20 in the extended position and the cutting tool sub-assembly 40 in the retracted position. FIG. 4 shows the stripping tool sub-assembly 20 in the retracted position and the cutting tool sub-assembly 40 in the extended position. The fiber optic strip and cut tool 60 may include a locking protrusion 72 slidable within a slot 78 in the housing 70. The slot 78 may include a retracted locking aperture 74 for locking a sub-assembly in the retracted position and an extended locking aperture 76 for locking a sub-assembly in the extended position. The stripping tool sub-assembly 20 is used for removing the outer jacket 8 or other protective layer of the fiber optic cable 10. The cutting sub-assembly is used for cutting the strands of protective fibers, such as Kevlar or aramid yarn 18, from the fiber optic cable 10.

Figure 15:
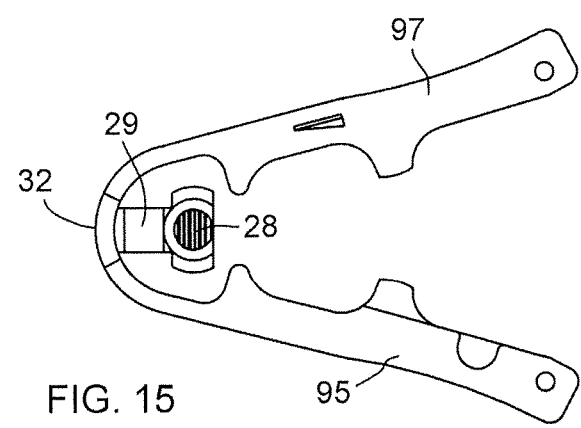
FIG. 15 is a side view of the stripping and cutting blade guard.

FIGS. 5-7 show the stripping tool sub-assembly 20 which includes a frame or exterior sheath 26, the sheath 26 shown in greater detail in FIG. 15. The stripping sub-assembly 20 includes opposing stripping blades 22, 24 which pivot with respect to each other. The opposing stripping blades 22, 24 may pivot about a fulcrum 32 disposed on the sheath 26. The fulcrum 32 may be a flexible hinge or living hinge. The sheath 26 attaches the stripping blades 22, 24 to one another so the blades 22, 24 travel toward and away from one another from an open position to one of several closed stripping positions. The degree of closure is dependent on the size of the layer to be stripped. The stripping sub-assembly 20 includes opposing teeth 34 and notches 30. The stripping is performed by placing the fiber optic cable 10 between opposing notches 30, urging the stripping blades 22, 24 toward one another and pulling the fiber optic cable 10 axially until a portion of the layer to be stripped is removed from the fiber optic cable 10. The stripping sub-assembly 20 may include the protrusion 28 for locking the stripping sub-assembly 20 in the extended or retracted position. A stop 36 may also be included for preventing the stripping sub-assembly 20 from being pulled completely out of the housing 70.

Figure 9:
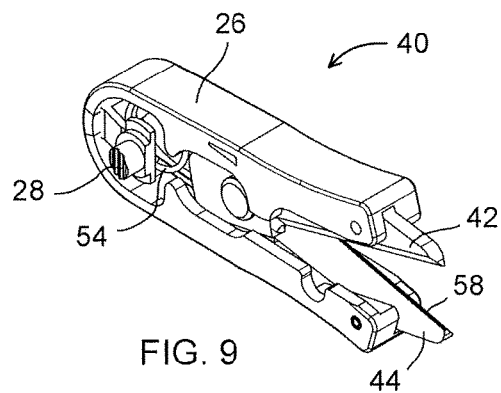
FIG. 9 is a perspective view of the cutting sub-assembly.
Figure 10:
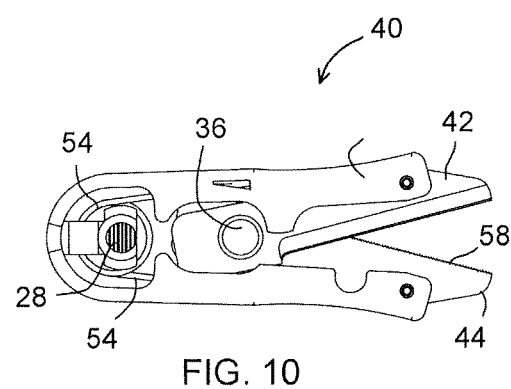
FIG. 10 is a side elevational view of the cutting sub-assembly.

FIGS. 8-10 show the cutting sub-assembly 40 which includes a frame or exterior sheath 26 opposing cutting blades 42, 44 which are pivotable with respect to each other. The opposing cutting blades 42, 44 may pivot about a fulcrum 32 disposed on the sheath. The fulcrum 32 may be a flexible hinge or living hinge. The sheath 26 attaches the cutting blades 42, 44 to one another so the cutting blades 42, 44 travel toward and away from one another from an open position to a closed cutting position. The cutting tool sub-assembly 40 may include serrations 58 along at least one of the cutting blades 42, 44. The cutting is performed by placing the exposed protective fibers 18 between opposing cutting blades 42, 44, which face each other, and urging the cutting blades 42, 44 toward one another until a portion of the exposed strands of protective fibers 18, are removed from the fiber optic cable 10. The cutting sub-assembly 40 may include the protrusion 28 for locking the cutting sub-assembly 40 in the extended or retracted position. A stop 36 may also be included for preventing the cutting sub-assembly 40 from being pulled completely out of the housing 70. The cutting sub-assembly 40 may include a spring 54 for biasing the cutting blades 42, 44 in the open position.

Figure 11:
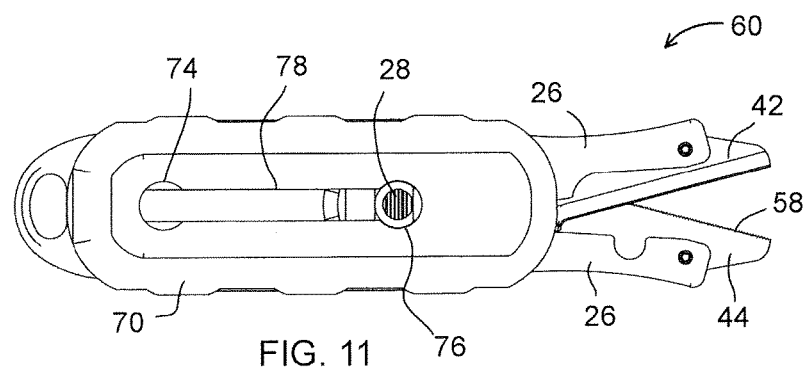
FIG. 11 is a side elevational view of the fiber optic strip and cut tool with the stripping sub-assembly in the extended position.
Figure 12:
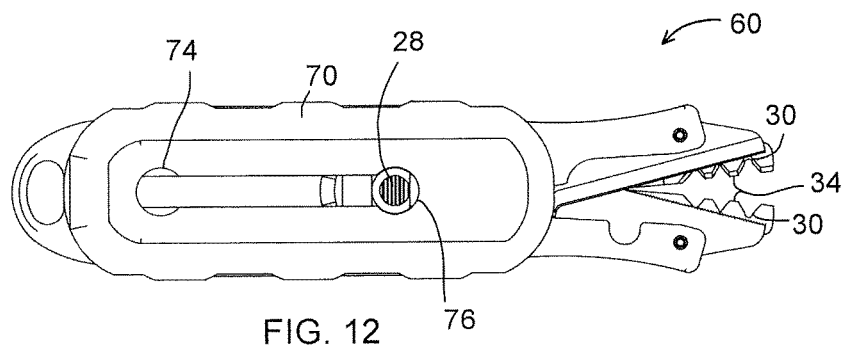
FIG. 12 is a side elevational view of the fiber optic strip and cut tool with the cutting sub-assembly in the extended position.
Figure 13:
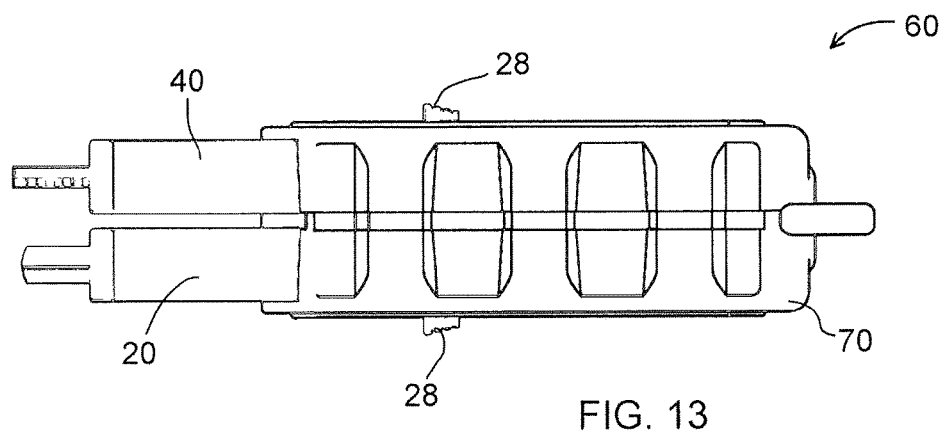
FIG. 13 is a top plan view of the fiber optic strip and cut tool with the cutting sub-assembly in the extended position.
Figure 14:
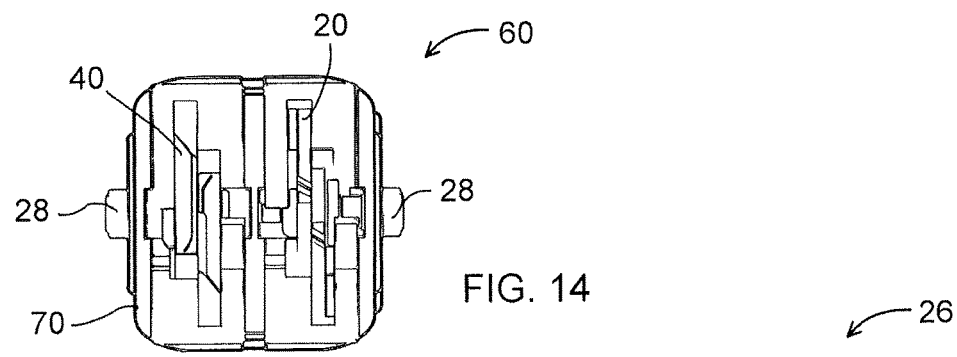
FIG. 14 is a front view of the fiber optic strip and cut tool with the sub-assemblies in the extended position.

FIG. 11 shows a side elevational view of the fiber optic strip and cut tool 60 with the cutting tool sub-assembly 40 in the extended position. FIG. 12 shows the opposite side in a side elevational view of the fiber optic strip and cut tool 60 with the stripping tool sub-assembly 40 in the extended position. In the extended position the protrusion 28 extends through the extended locking aperture 76. The retracted position locking aperture 74, slot 78 and extended position locking aperture 76 are disposed on both sides of the fiber optic strip and cut tool 60. FIGS. 13 and 14 show a top elevational view and a front elevational view, respectively, of the fiber optic strip and cut tool 60 with the stripping sub-assembly and the cutting sub-assembly in the extended position.

FIG. 15 shows a side elevational view of the exterior sheath 26 or frame for the stripping tool sub-assembly 20 and the cutting tool sub-assembly 40. The exterior sheath 26 includes a protrusion 28 for locking the sub-assembly into the extended or retracted position. The exterior sheath 26 includes a fulcrum 32 which pivotally connects the opposing arms 95, 97. Each of the opposing arms 95, 97 holds one of the opposing cutting blades 42, 44 or opposing stripping blades 22, 24 of the cutting sub-assembly 40 or the stripping sub-assembly 20, respectively. The protrusion 28 may be flexibly secured to the exterior sheath 26 with an attachment member 29 adjacent the fulcrum 32. The protrusion 28 may alternately be flexibly attached at any location on the stripping tool sub-assembly 20 and at any location on the cutting tool sub-assembly 40 corresponding with the retracted position locking aperture 74, slot 78 and extended position locking aperture 76.

In a method for using the fiber optic stripping and cutting device 60 as shown in FIGS. 4 and 5, a user begins with the fiber optic stripping and cutting device 60 having both the stripping sub-assembly 20 and the cutting sub-assembly 40 in the retracted position. The user extends the stripping sub-assembly 20 from the housing by depressing the protrusion 28, sliding the protrusion 28 along the slot 78 in the direction of arrow 82 to the extended position locking aperture 76 and releasing the protrusion 28 into the extended position locking aperture 76, locking the stripping tool sub-assembly 20 into the extended position. The user then removes a portion of the outer jacket 8 to expose a portion of the protective fibers 18 by placing the fiber optic cable 10 between two teeth 34 and within the notch 30, urges each of the stripping blades 22, 24 toward one another and pulls the fiber optic cable 10 axially forcing a portion of the outer jacket 8 from the fiber optic cable 10. Pulling the fiber optic cable 10 axially may be described as pulling the fiber optic cable 10 perpendicular to a plane of one of the stripping blades 22, 24. The user retracts the stripping tool sub-assembly 20 into the housing by depressing the protrusion 28, sliding the protrusion 28 along the slot 78 in the direction of arrow 84 to the retracted position locking aperture 74 and releasing the protrusion 28 into the retracted position locking aperture 74, locking the stripping tool sub-assembly 20 into the retracted position. The user extends the cutting tool sub-assembly 40 from the housing 70 by depressing the protrusion 28, sliding the protrusion 28 along the slot 78 in the direction of arrow 86 to the extended position locking aperture 76 and releasing the protrusion 28 into the extended position locking aperture 76, locking the cutting sub-assembly 40 into the extended position. The user actuates the cutting sub-assembly 40 by urging the cutting blades 42, 44 toward one another to cut the exposed portion of the protective fibers 18. The user retracts the cutting sub-assembly 40 into the housing 70 by depressing the protrusion 28, sliding the protrusion 28 along the slot 78 in the direction of arrow 88 to the retracted position locking aperture 74 and releasing the protrusion 28 into the retracted position locking aperture 74, locking the cutting sub-assembly 40 into the retracted position. The fiber optic cable 10 is thus prepared for termination to a fiber optic connector.

Thus, the present invention provides a tool which performs multiple functions in working with fiber optic cables, has retractable sub-assemblies for stripping fiber optic cable layers and which safely secures cutting surfaces while providing multiple functions within the tool.

The tool strips the outer jacket from a fiber optic cable and cuts the aramid yarn or Kevlar from one of the inner layers of the fiber optic cable, includes removable subassemblies for working with fiber optic cables and has the ability to lock each function in the extended and retracted position.

While the present invention has been particularly described, in conjunction with a specific preferred embodiment, it is evident that many alternatives, modifications and Thus, having described the invention, what is claimed is:

1. A fiber optic stripping and cutting apparatus comprising:
   a tool housing;
   a stripping tool slidingly secured to the tool housing, the stripping tool having a pair of opposing stripping blades pivotable with respect to each other, each stripping blade having at least two teeth, the teeth on one stripping blade aligned with teeth on the opposite stripping blade; and
   a cutting tool slidingly secured to the tool housing, the cutting tool having a pair of opposing flat blades, each flat blade including a sharp edge;
   wherein the stripping and cutting tools are each independently slideable from a retracted position within the housing to an extended position at least partially extending from the tool housing;
   wherein the stripping tool and cutting tool each include a sheath having a first and second arm pivotable about a sheath fulcrum, each sheath fulcrum having a corresponding sheath pivot axis, the first arm secured to and movable with one stripping tool blade or cutting tool blade and the second arm secured to and movable with the opposite stripping tool blade or cutting tool blade;
   wherein the stripping tool includes a first protrusion engagable with a first aperture on the tool housing for locking the stripping tool in the extended position and the cutting tool includes a second protrusion engagable with a second aperture on the tool housing for locking the cutting tool in the extended position, the first and second protrusion secured to the corresponding sheath with a flexible attachment member adjacent the fulcrum; and
   wherein the cutting tool blades have a cutting tool blade pivot axis spaced from the cutting tool sheath pivot axis and the stripping tool blades have a stripping tool blade pivot axis spaced from the stripping tool sheath pivot axis.

2. The fiber optic stripping and cutting apparatus of claim 1 wherein the sheath fulcrum is a living hinge.

3. The fiber optic stripping and cutting apparatus of claim 1 including notches between each of the stripping tool teeth, the fiber optic cable engagable within the notches.

4. The fiber optic stripping and cutting apparatus of claim 3 wherein the stripping blades include at least one notch aligned with a notch on the opposing stripping blade and the fiber optic cable is engagable between the aligned notches.

5. The fiber optic stripping and cutting apparatus of claim 3 wherein each stripping blade includes three different sized notches each aligned with opposing notches on the opposite stripping blade.

6. The fiber optic stripping and cutting apparatus of claim 1 wherein the cutting tool includes a spring for biasing the cutting tool in an open position.

7. The fiber optic stripping and cutting apparatus of claim 1 wherein the cutting tool includes serrations on at least one of the cutting blades.

8. The apparatus of claim 1 wherein the first protrusion slidable is within a first slot on the tool housing for allowing a user access to the first protrusion for moving the stripping tool from the retracted position to the extended position and from the extended position to the retracted position and the second protrusion is slidable within a second slot on the tool housing for allowing the user access to the second protrusion for moving the cutting tool from the retracted position to the extended position and from the extended position to the retracted position, the first and second protrusion flexibly secured to the corresponding sheath with a flexible attachment member adjacent the fulcrum.

9. A method for using a fiber optic stripping and cutting apparatus comprising:
   providing a stripping tool and a cutting tool each independently slidingly secured to a tool housing, the stripping tool having a pair of opposing stripping blades pivotable with respect to each other, each stripping blade having at least two teeth, the teeth on one stripping blade aligned with teeth on the opposite stripping blade and the cutting tool having a pair of opposing flat blades, each flat blade including a sharp edge, wherein the first and second utensil are each independently slideable from a retracted position within the housing to an extended position at least partially extending from the tool housing wherein the stripping tool and cutting tool each include a sheath having a first and second arm pivotable about a sheath fulcrum, each sheath fulcrum having a corresponding sheath pivot axis, the first arm secured to and movable with one stripping tool blade or cutting tool blade and the second arm secured to and movable with the opposite stripping tool blade or cutting tool blade wherein the cutting tool blades have a cutting tool blade pivot axis spaced from the cutting tool sheath pivot axis and the stripping tool blades have a stripping tool blade pivot axis spaced from the stripping tool sheath pivot axis;
   providing a fiber optic cable having an optical fiber, strands of protective fibers and an outer jacket;
   extending the stripping tool from the housing;
   using the stripping tool to remove a portion of the outer jacket, exposing a portion of the protective fiber strands;
   retracting the stripping tool into the housing;
   extending the cutting tool from the housing;
   using the cutting tool to cut the exposed portion of the protective fiber strands; and
   retracting the cutting tool into the housing;
   wherein the stripping tool includes a protrusion and the tool housing includes a slot and an aperture near an end of the housing and the steps of extending the stripping tool from the housing or retracting the stripping tool into the housing includes pressing the protrusion and sliding the protrusion along the slot to the aperture and releasing the protrusion to extend into the aperture, locking the stripping tool into the extended or retracted position, the stripping tool protrusion and cutting tool protrusion are secured to the stripping tool and cutting tool sheath respectively, with a flexible attachment member adjacent the fulcrum.

10. The method of claim 9 wherein the step of using the stripping tool to remove a portion of the outer jacket includes placing the cable between the at least two teeth, urging each of the stripping blades toward one another and pulling the cable perpendicular to a plane of one of the stripping blades, forcing a portion of the outer jacket from the cable.

11. The method of claim 9 wherein the step of using the cutting tool to remove a portion of the protective fibers includes placing the exposed protective fibers between the cutting blades and urging each of the cutting blades toward one another, cutting a portion of the protective fibers from the cable.

12. The method of claim 9 wherein the cutting tool includes a second protrusion and the tool housing includes a second slot and a second aperture near the end of the housing and the step of extending the cutting tool from the housing includes pressing the second protrusion and sliding the second protrusion along the second slot to the second aperture and releasing the second protrusion to extend into the second aperture, locking the cutting tool into the extended position.

13. The method of claim 9 wherein each stripping blade includes three different sized notches each aligned with opposing notches on the opposite stripping blade and the step of using the stripping tool to remove a portion of the outer jacket includes choosing an appropriate notch pair and engaging the fiber optic cable in the chosen notch pair.

14. The method of claim 9 wherein the cutting tool includes a spring for biasing the cutting tool in an open position.

15. The method of claim 9 wherein the stripping tool and cutting tool are removable from the tool housing.

16. A fiber optic stripping and cutting apparatus comprising:
   a tool housing;
   a stripping tool slidingly secured to the tool housing, the stripping tool having a pair of opposing stripping blades pivotable with respect to each other, each stripping blade having at least two teeth, the teeth on one stripping blade aligned with teeth on the opposite stripping blade; and
   a cutting tool slidingly secured to the tool housing for cutting fiber optic cables, the cutting tool having a pair of opposing flat blades, each flat blade including a sharp edge;
   wherein the stripping and cutting tools are each independently slideable from a retracted position within the housing to an extended position at least partially extending from the tool housing;
   wherein the stripping tool and cutting tool each include a sheath having a first and second arm pivotable about a sheath fulcrum, each sheath fulcrum having a corresponding sheath pivot axis, the first arm secured to and movable with one stripping tool blade or cutting tool blade and the second arm secured to and movable with the opposite stripping tool blade or cutting tool blade, the cutting tool blades have a cutting tool blade pivot axis spaced from the cutting tool sheath pivot axis and the stripping tool blades have a stripping tool blade pivot axis spaced from the stripping tool sheath pivot axis; and
   wherein the stripping tool includes a first protrusion engagable with a first aperture on the tool housing for locking the stripping tool in the retracted position and the cutting tool includes a second protrusion engagable with a second aperture on the tool housing for locking the cutting tool in the retracted position, the first and second protrusion secured to the corresponding sheath with a flexible attachment member adjacent the fulcrum.

17. The apparatus of claim 16 wherein the first protrusion slidable is within a first slot on the tool housing for allowing a user access to the first protrusion for moving the stripping tool from the retracted position to the extended position and from the extended position to the retracted position and the second protrusion is slidable within a second slot on the tool housing for allowing the user access to the second protrusion for moving the cutting tool from the retracted position to the extended position and from the extended position to the retracted position, the first and second protrusion flexibly secured to the corresponding sheath with a flexible attachment member adjacent the fulcrum.

\* \* \* \* \*